Feb. 8, 1966  G. K. RAIDER ETAL  3,233,923
FLEXIBLE TUBING RETAINER
Filed June 24, 1963  2 Sheets-Sheet 1
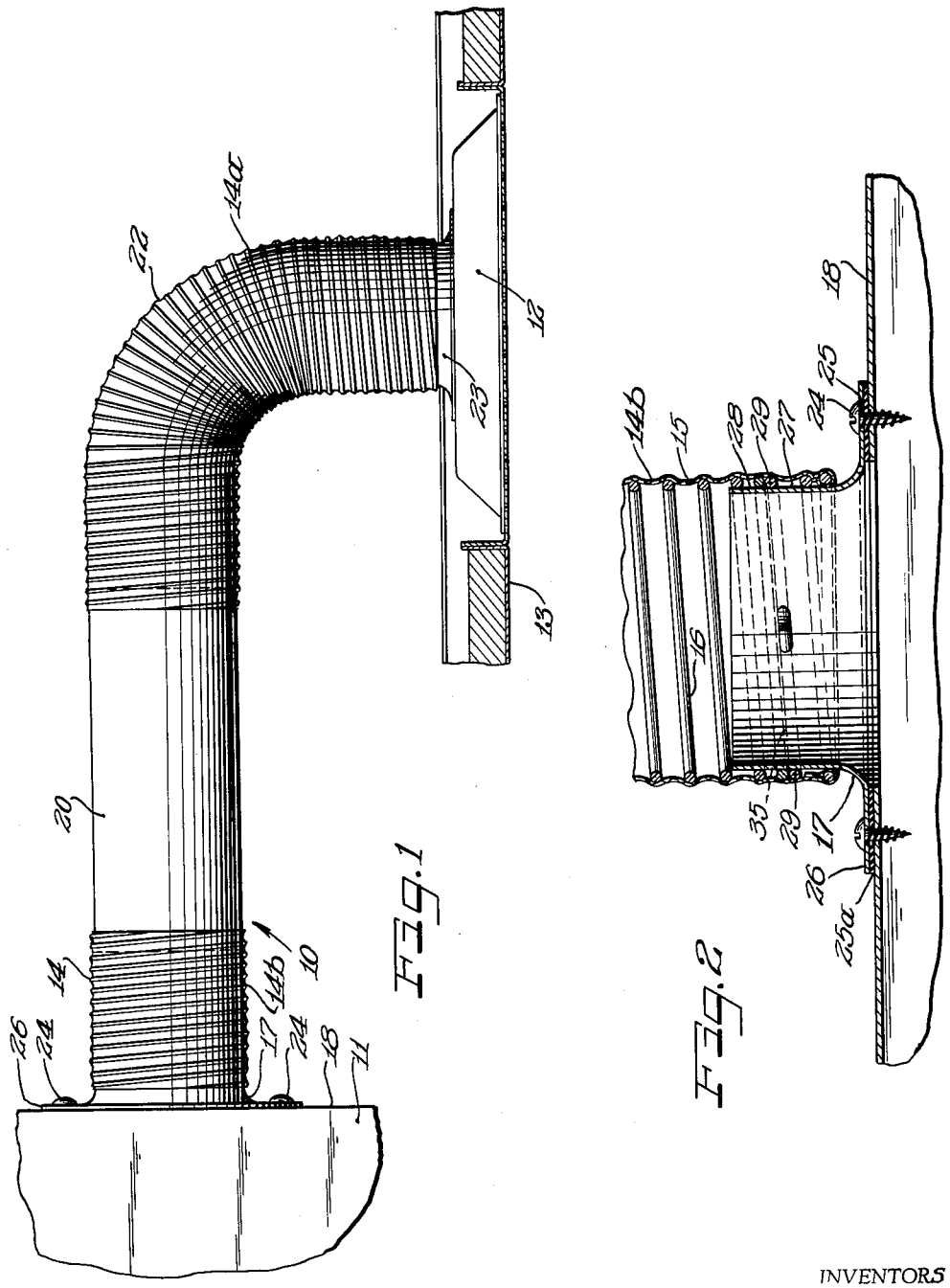
INVENTORS
George K. Raider
Lester W. Burns
by
ATTORNEYS Feb. 8, 1966 G. K. RAIDER ETAL 3,233,923
FLEXIBLE TUBING RETAINER
Filed June 24, 1963 2 Sheets-Sheet 2
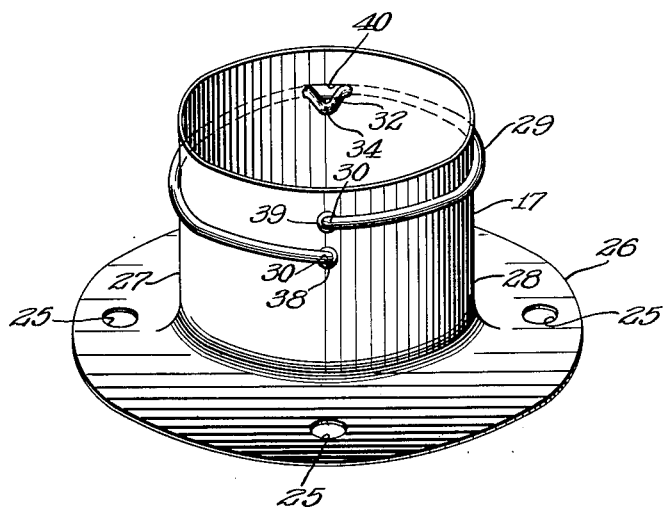
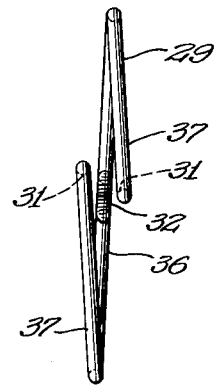
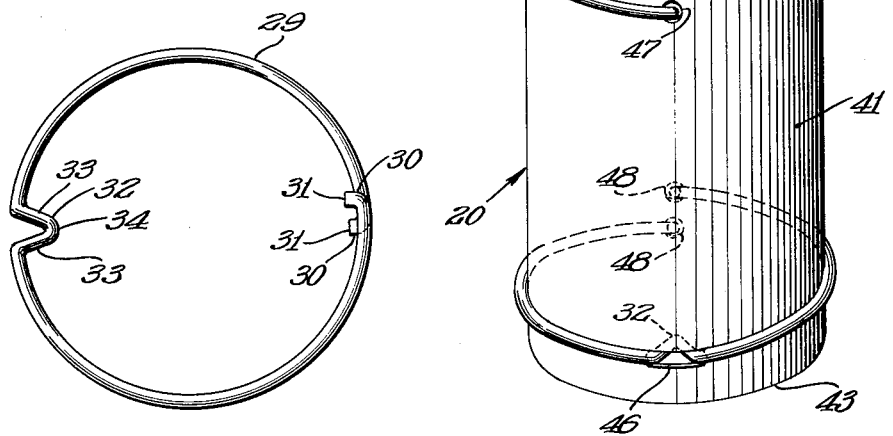
INVENTORS
George K. Raider
Lester W. Burns
by
ATTORNEYS

United States Patent Office 3,233,923
Patented Feb. 8, 1966

3,233,923
FLEXIBLE TUBING RETAINER
George K. Raider, Chicago, and Lester W. Burns, Itasca, Ill., assignors to The Pyle-National Company, Chicago, Ill., a corporation of New Jersey
Filed June 24, 1963, Ser. No. 289,840
1 Claim. (Cl. 285—239)

This invention relates generally to a coupling or connecting device for assembling and retaining a reinforced flexible tube in connected relation with a collar or a valve fitting and more specifically comprises a wire-form member having snap-in connecting means cooperating with a sleeve-like part such as a collar so that the wire form member will form in association with the collar a projection disposed as a thread helix to threadedly engage the adjoining end of the flexible tube.

Prior art retainers or connectors are known for fastening or connecting portions of flexible tubing to air ducts, duct collars, other portions of flexible tubing and the like in which a portion of the retainer or connector is integrally threaded to receive in threaded engagement a complementarily wound wire-like structural member of the tubing. Such known connectors are generally satisfactory but because the threads of such connectors are formed integrally with the body portion, they are relatively expensive in manufacture. Expensive equipment is required to form the threads in the connector and various thread-forming equipment must be used to form threads of varying pitch. Further, once the threads of a prior art connector are formed, the pitch thereof cannot easily be changed.

The present invention was evolved with the general object of overcoming such disadvantages of the prior art.

In accordance with the principles of the present invention the threads of a retainer or connector are formed by means of a wire loop attached to the body portion of the retainer. The manufacture of the component parts is reduced to a minimum and assembly thereof can be made so quickly and easily that manufacturing costs of a completed retainer are substantially reduced. Further, the pitch of the threads of the retainer can be easily varied to accommodate tubing having different thread-pitch.

Therefore, a primary object of the present invention is to provide an inexpensive and easily manufactured retainer or connector for flexible tubing or the like.

Another object of the present invention is to provide a threaded retainer wherein the threads themselves do not form a constituent part of the body portion of the retainer.

Another object of the present invention is to provide a container composed of an assembly of a body member and a separately formed wire member which is attached in assembled relation to the body member for forming a coupling projection thereon.

And yet another object of the present invention is to provide an inexpensive and easily assembled retainer which is comprised of a tubular body member and a separate wire member wound about and attached to the body member in helical disposition to receive in connecting engagement a complementarily formed portion of a flexible tube or the like in threaded together assembly.

Many other features, advantages and additional objects will become manifest to those versed in the art from the detailed description of the invention which follows and the accompanying sheets of drawings in which a preferred embodiment of a retainer or connector incorporating the principles of the present invention is shown by way of illustrative example.

On the drawings:
FIGURE 1 is a fragmentary elevational view of an air transferring or air handling system including connectors or retainers incorporating the principles of the present invention;
FIGURE 2 is an enlarged fragmentary sectional view of a portion of the system of FIGURE 1;
FIGURE 3 is a perspective view of one embodiment of a retainer or connector incorporating the princples of the present invention wherein is illustrated a flexible tubing duct collar;
FIGURE 4 is a perspective view of another embodiment of a retainer incorporating the principles of the present invention wherein is illustrated a tubing coupling;
FIGURE 5 is an end view of a wire loop illustrating the spiral or helical configuration thereof; and
FIGURE 6 is a front view of the wire loop of FIGURE 5.

As shown on the drawings:
Although the principles of the present invention are of utility in a variety of retaining or connecting applications a particularly useful application is made to retainers or connectors for flexible tubing in air transfer or air supply systems.

For example, in many forced air heating or air conditioning systems conditioned air is supplied to various outlets in the conditioned spaced through sheet metal duct work. Recently, however, round flexible duct work or tubing has been used extensively in such systems, especially in connecting air diffusers situated at the outlets to sheet metal duct work.

An illustrative embodiment of such an air supply system incorporating flexible tubing is herein shown and consists of a forced air heating or cooling supply system indicated generally at 10 in FIGURE 1 including a supply air duct 11 connected to an air distributor or ceiling type air diffuser 12 which is mounted above a ceiling line as at 13. The connection between the air duct 11 and the diffuser 12 is made in part by means of flexible tubing as indicated generally at 14. The diffuser 12 exemplifies any useful air distributor whether it be a combined air-light fixture, a lowered fixture, or a diffuser type outlet as illustrated.

Various types of flexible tubing are known and in one variety most commonly used flexible material such as poly-vinyl coated fiber glass as shown at 15 in FIGURE 2 is fused to a flexible structural member such as a spiral or helical wound vinyl coated galvanized wire as at 16. The tube could be reinforced by integral ribs or embossments without departing from the principles of this invention.

Such tubing 14 has a natural tendency to assume a cylindrical configuration but may be easily formed into a rounded elbow portion as at 14a as well as other shapes that would be relatively expensive to manufacture if solid sheet metal fittings were employed.

The pitch of the convolutions of the helical wound reinforcements such as the wire 16 is constant along the length of a straight portion of tubing 14b, and it is common to make use of this constant pitch by employing the wire 16 as threads in connecting a length of tubing 14 to another length of tubing or to an air duct as at 11 or a diffuser as at 12 by threading the wire 16 to a complementarily threaded connector or retaining member.

In FIGURES 1 and 2, a tubing connector or duct collar 17 which incorporates the principles of the present invention is fastened to a side 18 of the air duct 11 and is threadedly connected to a straight run of horizontally extending flexible tubing as at 14b.

A coupling 20 connects the straight run 14b to another run of tubing as at 14a which forms a 90° elbow as at 22 bent vertically downwardly to connect to a diffuser collar as at 23.

Referring specifically to FIGURE 2, the duct collar 17 is preferably fastened to the side 18 of the air duct 11 by means of sheet metal screws as at 24 which are inserted through holes 25 formed in a flange portion 26 of the duct collar 17. For preventing leakage gasketing material is shown as at 25a between the flange portion 26 and air duct 11. A tubular body member 27 of the collar 17 projects from the flange portion 26 at right angles to the air duct side 18. It will be noted that the body member 27 is formed of sheet metal material or the like and is flat in an axial direction in the sense that no threads or other undulations are formed thereon. In the illustrated embodiment of the tubing 14b, the material 15 is wrapped around the outer periphery of the wire 16 and the diameter of the tubing is sized to fit around the outer surface 28 of the body member 27.

In accordance with the present invention, a simple wire 35 is snapped onto the smooth outer surface of the sleeve-like collar 27 to form a projection or abutment disposed on a helical path. The wire 35 is formed as a loop 29 and the loop is fastened to the periphery of the body member 27 and forms a helical thread having a pitch equal to the pitch of the tubing wire 16. It will be apparent that as the tubing 14b is rotated about the axis of the body member 27, the wire 16 of the tubing 14b and the wire loop 29 which is fastened to the member 27 will engage in threaded relation and the tubing 14b will thereby be retained or connected to the collar 17.

Referring to FIGURE 6, the wire loop 29 projects a circular configuration when viewed from the front thereof and is particularly characterized by a pair of overlapping end portions 30, 30 which are radially inwardly directed to form a pair of lugs, prongs or tangs 31, 31. Diametrically opposite the tangs 31, 31 the wire loop 29 is crinkled or bent to form a radially inwardly extending V-shaped projection 32 comprising a pair of converging straight portions 33, 33 and an arcuately shaped end portion 34.

In FIGURE 5, an end view of the wire loop 29 projects a straight portion 36 and a pair of parallel end portions 37, 37 disposed at an oblique to the straight portion 36. The pitch of the wire loop, as will be understood by those skilled in the art, is the distance along an imaginary axis of the loop 29 between corresponding portions of the end portions 37, 37. In the embodiment shown, the free state configuration of the wire loop 29 is illustrated in FIGURE 5, although it will become apparent that a "built-in" pitch need not be incorporated into the free state configuration of the loop 29.

Referring to FIGURE 3, the tubular body member 27 of the collar 17 has formed therein a pair of axially spaced perforations or apertures 38 and 39. Likewise, diametrically opposite the apertures 38 and 39 a circumferentially elongated slot 40 is formed in the body member 27 and is disposed axially intermediate the apertures 38 and 39. The width of the slot 40 and the diameter of apertures 38 and 39 are slightly greater than the diameter of the wire which forms the loop 29.

In the embodiment illustrated, the projected free state inner diameter of the wire loop 29 as viewed in FIGURE 6, is equal to or slightly less than the outer diameter of the body member 27. In order to fasten the wire loop 29 to the body member 27 for forming threads thereabout, the loop is expanded by finger pressure beyond its free state diameter and positioned about the outer periphery of the member 27. The projection 32 of the loop is then inserted into the slot 40 and the end portions 30, 30 of the loop are then inserted into apertures 38 and 39 respectively. The natural resiliency of the loop 29 makes this assembly operation particularly rapid and easy since a "snap-in" action is afforded which avoids the necessity of special tools.

In FIGURE 4, the flexible tubing coupling 20 is particularly characterized as having a tubular body member 41 having formed therein at opposite end portions thereof as at 42 and 43 a pair of slots 44 and 46 and diametrically oppositely disposed apertures 47, 47 and 48, 48. The space between corresponding apertures 47, 47 and 48, 48 is equal to the pitch of the wire loop 29, which is, in turn, dimensioned so as to be equal to the pitch of the wire 16 of the flexible tubing 14 (FIGURE 1). The coupling 20 is therefore adapted to receive in threaded engagement therewith a flexible tubing at each end thereof.

Accordingly there has been provided a connector or retainer for flexible tubing which is constructed of elementary components, can be inexpensively manufactured and easily assembled and is susceptible to a wide range of thread pitch by merely repositioning the perforations formed in the body member and varying the diameter of the wire loop. It will be appreciated that the required pitch need not be "built-in" to the wire loop in its free state configuration, since the natural resiliency of the loop as it is expanded around the periphery of the body member is sufficient to maintain the tangs and V-shaped projection of the loop in the corresponding apertures and slot. The proper pitch of the loop will obtain, therefore, after the loop is properly fastened to the body member.

Although various modifications might be suggested by those versed in the art, I wish to embody within the scope of the patent warranted hereon all such modifications as come within the scope of my contribution to the art.

We claim as our invention:

In combination,
  a flexible tubing of the type constructed with a strengthening support affording a helical ridge or groove,
  a thin-walled tubular connector member having a portion of cylindrical configuration adapted to make screwed together engagement with said helical ridge or goove of said tubing,
    said connector portion being particularly characterized by having formed therein,
      a pair of axially aligned apertures spaced apart longitudinally by a spacing dimension corresponding to the pitch of the helical ridge or groove of the tubing,
      and an elongated slot spaced diametrically opposite said apertures and disposed on a helical path traced therebetween,
  and a spring wire thread-forming member having a circular loop configuration of an inner diameter corresponding to the outer diameter of said connector member for effecting a snug fit with the peripheral surface of said connector member,
    said spring wire having an offset portion intermediate its ends extending radially inwardly a sufficient extent to anchor said spring wire in firm assembly with the walls of said connector member,
    the respective ends of said spring wire wrapping snugly around said connector member projecting radially outwardly from the peripheral surface thereof to form a screw thread abutment of thicker extent than the thickness of the connector wall,
      each respective end of said spring wire terminating in a radially inwardly extending locking tang offset at right angles and extending radially approximately the thickness of the thin-walled tubular connector member for reception and seating in a corresponding one of said pair of apertures, the radial extent of each tang being sufficiently long to form an abutment shoulder for engaging the edges of said corresponding aperture and being sufficiently short to afford a snap-end locking assembly of the spring wire with said connector member without the use of any tools, whereby said spring wire forms a stable screw thread abutment on said connector member for effecting a screw thread engagement with said tubing.

References Cited by the Examiner

UNITED STATES PATENTS

| | | | |
|---|---|---|---|
| 368,372 | 8/1887 | Bingham | 285—298 |
| 1,645,490 | 10/1927 | Keener | 285—390 |
| 1,780,825 | 11/1930 | Kuhn | 287—125 |
| 2,284,222 | 5/1942 | Miller | 29—453 |
| 2,418,418 | 4/1947 | Martin | 287—125 |
| 2,580,872 | 1/1952 | Wise | 285—390 |
| 2,669,469 | 2/1954 | Finch | 285—390 |
| 2,846,831 | 8/1958 | Dobbins | 29—453 |

FOREIGN PATENTS

| | | |
|---|---|---|
| 6,835 | 1884 | Great Britain. |
| 570,815 | 7/1945 | Great Britain. |
| 503,375 | 12/1954 | Italy. |

CARL W. TOMLIN, *Primary Examiner.*